(12) United States Patent
Eryilmaz et al.

(10) Patent No.: US 7,139,687 B2
(45) Date of Patent: Nov. 21, 2006

(54) ADAPTIVE LOOKUP TABLE: A GRAPHICAL SIMULATION COMPONENT FOR RECURSIVELY UPDATING NUMERIC DATA STORED IN TABLE FORM

(75) Inventors: Bora Eryilmaz, Boston, MA (US);
Pascal Gahinet, Hopkinton, MA (US);
Peter Maloney, Dearborn, MI (US);
Zhiping You, Natick, MA (US)

(73) Assignee: The Mathworks, Inc., Natick, MA (US)

( * ) Notice: Subject to any disclaimer, the term of this patent is extended or adjusted under 35 U.S.C. 154(b) by 857 days.

(21) Appl. No.: 10/036,675

(22) Filed: Dec. 31, 2001

(65) Prior Publication Data

US 2003/0122826 A1    Jul. 3, 2003

(51) Int. Cl.
*G06F 7/70* (2006.01)
(52) U.S. Cl. .......................................... 703/2; 715/763
(58) Field of Classification Search ................... 703/2; 715/763; 717/109; 707/102
See application file for complete search history.

(56) References Cited

U.S. PATENT DOCUMENTS

| | | | |
|---|---|---|---|
| 4,270,503 A * | 6/1981 | Pomerantz ................. 123/438 |
| 4,922,835 A | 5/1990 | Van Vliet et al. |
| 5,188,005 A | 2/1993 | Sankpal et al. |
| 5,432,700 A * | 7/1995 | Hrovat et al. ................ 701/37 |
| 5,474,054 A | 12/1995 | Povinger et al. |
| 5,533,492 A | 7/1996 | Willey et al. |
| 5,594,655 A * | 1/1997 | Berchin ....................... 702/77 |
| 5,743,244 A | 4/1998 | Bush et al. |
| 5,791,332 A | 8/1998 | Thompson et al. |
| 5,819,196 A | 10/1998 | Holmes et al. |
| 5,821,934 A * | 10/1998 | Kodosky et al. ............ 715/763 |
| 5,951,884 A | 9/1999 | Futamura |
| 5,974,254 A * | 10/1999 | Hsu ........................... 717/109 |
| 6,035,632 A * | 3/2000 | Stander et al. ................ 60/274 |
| 6,073,619 A | 6/2000 | Baranowski |
| 6,102,965 A * | 8/2000 | Dye et al. ................... 717/109 |
| 6,138,642 A * | 10/2000 | Zhang et al. ................ 123/478 |
| 6,161,531 A | 12/2000 | Hamburg et al. |
| 6,242,873 B1 * | 6/2001 | Drozdz et al. .............. 318/139 |
| 6,282,547 B1 * | 8/2001 | Hirsch ........................ 707/102 |
| 6,868,526 B1 * | 3/2005 | Singh .......................... 715/763 |
| 2003/0018953 A1 * | 1/2003 | Aberg ......................... 717/105 |

* cited by examiner

*Primary Examiner*—Albert W. Paladini
(74) *Attorney, Agent, or Firm*—Lahive & Cockfield, LLP

(57) ABSTRACT

A graphical block that defines the functionality of a lookup table and can be used in a block diagram model to capture time-varying characteristics of a system's behavior in the lookup table is presented. The block uses input and output data of the system to dynamically create and update the contents of the underlying lookup table over time. More specifically, the block utilizes an adaptation process that uses the system (or plant) output data to recompute the table values. The adaptation process is implemented as a statistical and signal processing algorithm, such as Recursive Sample Means (RSM), Least Mean Squares (LMS) and Recursive Least-Squares (RLS). The adaptation can be cell-based or point based.

75 Claims, 7 Drawing Sheets

Block Parameters: Adaptive Lookup Table

Adaptive Table Lookup (mask)
Perform 1 or 2 dimensional adaptive table lookup.
Breakpoint sets relate the input values to cell locations
in the table. The data is used to dynamically update
the cell values at these positions.

Parameters

Number of table dimensions: 2 —————————92

First input (row) breakpoint set:
[1 2 4]    —94

Second input (column) breakpoint set:
[1 2 3]    —94

106 — Use one (vector) input port for data

Table data (initial):
[1 2; 3 4]    —96

Table numbering matrix:
[1 2; 3 4]    —98

108 — Table matrix output port

Save table data to workspace

Table name:
ver    —100

110 — ⌐ Adaptation enable/disable port

_ Adapt to out-of-range data

Adaptation method Sample mean (with forgetting) —102

Adaptation speed (0 to 1):
0.6    —104

112 — ⌐ Cell lock enable/disable port

OK    Cancel    Help    Apply

FIG. 3

ADAPTIVE LOOKUP TABLE: A GRAPHICAL SIMULATION COMPONENT FOR RECURSIVELY UPDATING NUMERIC DATA STORED IN TABLE FORM

BACKGROUND

The invention relates generally to graphical block diagram modeling.

Dynamic systems may be modeled, simulated and analyzed on a computer system using graphical block diagram modeling. Graphical block diagram modeling graphically depicts mathematical relationships among a system's inputs, states and outputs, typically for display on a graphical user interface.

In a graphical block diagram model, graphical blocks describing the static or dynamic behavior of corresponding physical components are graphically connected to each other in order to simulate the aggregate behavior of the combined physical system or plant. The behavior of a physical system, which may include mechanical or electronic components, can be described in terms of numeric data stored in table (matrix) or multi-dimensional array format in computer memory. The resulting table or array is referred to as a lookup table and is well known in the art.

In the simpler two-dimensional case, lookup tables correspond to matrices studied in the field of mathematics. Each element of a matrix is a numerical quantity, which can be precisely located in terms of two indexing variables. At higher dimensions, lookup tables are represented as a collection of matrices, whose elements are described in terms of a corresponding number of indexing variables. In the area of computer programming and simulation, lookup tables provide a means to capture the behavior of a physical system. More specifically, the behavior of a system with M inputs and N outputs can be approximately described by using N M-dimensional lookup tables.

Lookup tables can be generated by experimentally collecting or artificially creating the input and output data of a system. In general, as many indexing parameters are required as the number of input variables. Each indexing parameter may range within a pre-determined number of values, which are called breakpoints. The set of all breakpoints corresponding to an indexing variable is called a grid. Hence, a system with M inputs has M grids or sets of breakpoints. For given input data, the breakpoints (in breakpoint sets corresponding to the input variables) are used to locate the array elements where the output data of the system are stored. For a system with N output data values, N array elements are located and the corresponding data are stored at these locations in a computer memory.

In prior lookup table schemes, once a lookup table is created using the system input and output data, the corresponding multi-dimensional array of values can be used in applications without the need for regenerating the system output data. Only the input data is required to locate the appropriate array elements in the lookup table, and the approximate system output data can be read from these locations. Therefore, a lookup table captures an input-output mapping of a static or dynamic system in the form of numeric data stored at pre-determined array locations.

Prior graphical block-based modeling and simulation tools, e.g., Simulink® from The MathWorks Inc, support graphical lookup table blocks that provide for such a static mapping of input-output behavior of a physical system. Because the behavior of actual physical systems can vary with time due to wear, environmental conditions, and manufacturing tolerances, however, the "static" lookup table block may not provide a valid representation of the plant characteristics at a given time.

SUMMARY

The present invention is therefore directed towards a graphical lookup table block that takes into account the time-varying nature of the system behavior that it is used to describe. In particular, the present invention provides methods and systems for adapting the values of a lookup table over time to account for additional data from the physical plant or system that it models.

In one aspect, the invention provides methods and apparatus, including computer program products, for table lookup. The methods include providing to a graphical block diagram model a graphical block that defines a lookup table and having inputs for receiving input data, and using the graphical block to update content stored in the lookup table based on received input data.

Particular implementations of the invention may provide one or more of the following advantages.

Unlike prior static lookup table blocks, the adaptive lookup table block of the present invention always provides a valid representation of plant dynamics even though plant behavior may be time varying. Moreover, the underlying adaptation techniques of the adaptive lookup table block are robust against reasonable measurement noise and provide appropriate filtering of noisy output measurements.

The graphical block can be used in a simulation program to dynamically and efficiently update the data stored in a lookup table. That is, the block forms part of a larger simulation model of a physical system, which is represented in a graphical simulation environment. This approach is highly reusable and presents a flexible interface to a user.

The adaptive lookup table defined by the graphical block can be realized in other forms, such as computer programs or code embedded in microprocessor hardware for real-time applications. Supplied in a suitable simulation environment as a graphical simulation block, the method or methods defining the underlying lookup table of the block can be used to automatically generate computer code for embedded applications.

Other features and advantages of the invention will be apparent from the following detailed description and from the claims.

DESCRIPTION OF DRAWINGS

FIG. 3 is an exemplary block parameter dialog box in which a user specifies block parameters for the adaptive lookup table block.

Like reference numerals will be used to represent like elements.

DETAILED DESCRIPTION

Figure 1:
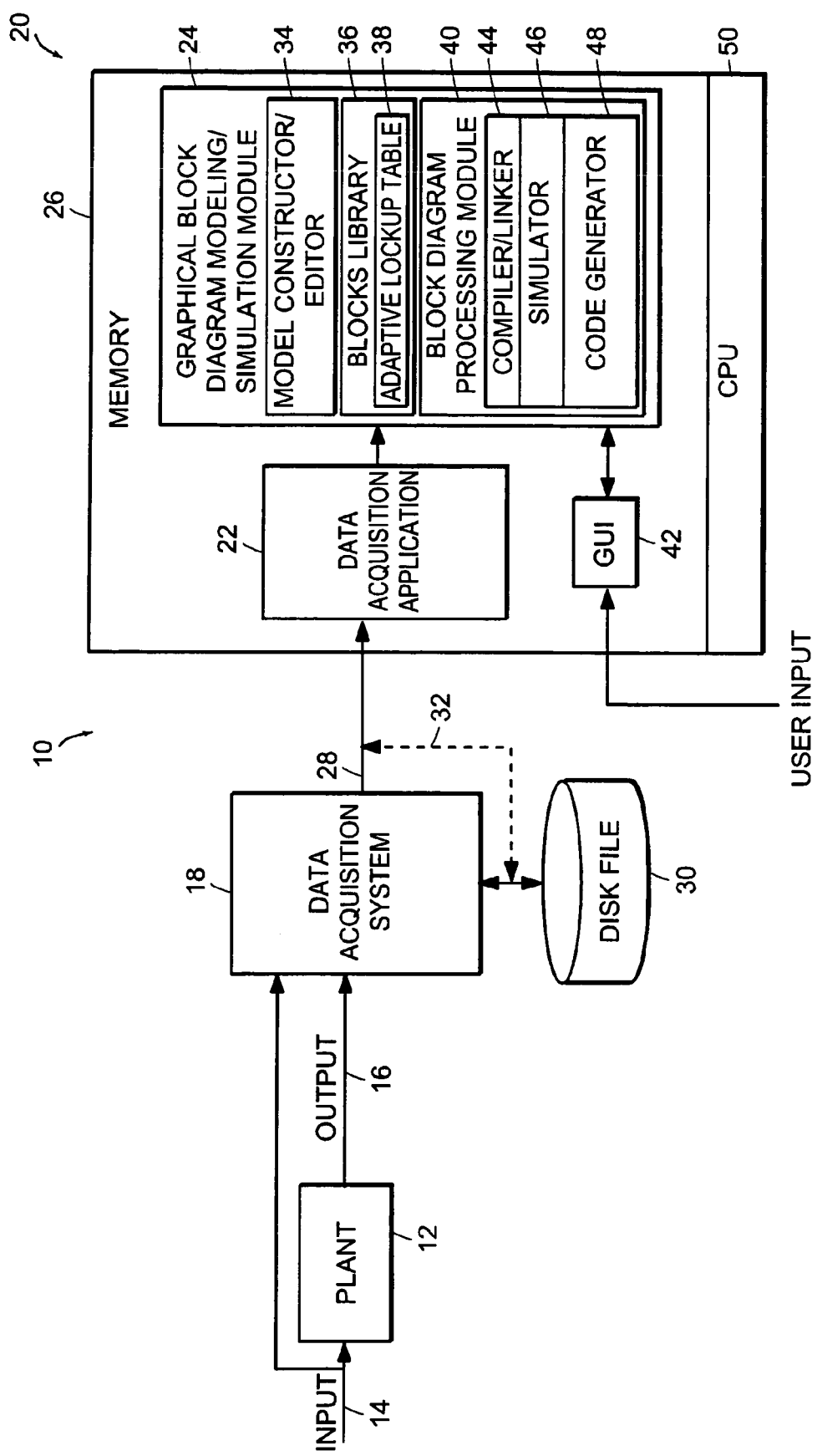
FIG. 1 is a block diagram of an exemplary system simulation environment in which processes of a graphical block diagram modeling/simulation module for graphical block diagram model development and execution, as well as code generation, are executed.

Referring to FIG. 1, a system simulation environment 10 includes a dynamic physical plant or system 12 having known input data 14 and measured output data 16. The output data 16 of the plant 12 can be produced, for example, by placing sensors at appropriate locations in a plant 12. The input data 14 and the measured plant output data 16 are provided to a data acquisition system 18. The data 14, 16 collected by the data acquisition system 18 are made available to a computer system 20 for analysis.

The computer system 20 is configured with a data acquisition application 22 and graphical block diagram modeling and simulation module 24 (hereinafter, simply, "the module"), both of which are implemented in software in memory 26. The data acquisition application 22 receives the experimental data 14, 16 collected by the data acquisition system 18 and provides that data to the module 24. The experimental data can be provided to the application 22 in real-time over a network link or bus 28 or, alternatively, can be stored in a disk file 30 for subsequent retrieval by the application 22 (as indicated by the dashed lines 32). Thus, the data acquisition system 18 need not be coupled to the system 20 as shown.

The module 24 includes a model constructor/editor 34 and a blocks library 36, which includes, among other types of graphical simulation blocks, an adaptive lookup table block 38. The adaptive lookup table block 38 uses the input and output measurements of the plant behavior to create and update the contents of an underlying lookup table. More specifically, the block 38 uses the plant input data to locate table (array) elements by comparing the input data values with breakpoints defined for each indexing variable, and uses the plant output measurements to update the numeric values of the array elements. Thus, the block continuously improves the contents of the lookup table over time. This continuous improvement of the table data is referred to herein as lookup table adaptation. The adaptation process involves complex statistical and signal processing algorithms to capture the time-varying input-output behavior of the plant. The adaptive lookup table block 38 will be described in further detail later.

Still referring to FIG. 1, the module 24 further includes a block diagram processing module (or engine) 40. The model editor 34, in conjunction with the library 36, is used by a user (of the computer system 20) via a Graphical User Interface (GUI) 42 to construct and display a graphical block diagram model which visually and pictorially represents aspects of a dynamic system of interest to that user. The block diagram processing engine 40 includes a compiler/linker 44 to interpret the block diagram generated by the model editor 34, a simulator 46 that executes the interpreted block diagram to produce simulation results and a code generator 48 that converts the interpreted block diagram to executable code (e.g., textual source code, such as C, or firmware source code for execution on an embedded processor), or transmits signals that configure or can be used to configure a hardware device, for example, a field programmable gate array. The simulation results of the adaptive lookup table can also be presented to the user on the computer screen (as later shown in FIG. 7B).

In addition to the memory 24, the system 20 also includes a CPU 50 for executing the various components of the module 20, the GUI 42 and other OS programs (not shown) for controlling system hardware. Although not shown, it will be understood that the system 20 can be, in other respects, of a conventional computer (e.g., PC, workstation) design and architecture. That is, the system 20 may include conventional system I/O peripherals, e.g., display, mouse, keyboard and the like, for enabling user interaction with the system.

For illustrative purposes, the module 24 will be described within the context of a simulation environment that is based on the use of such tools as MATLAB®, Simulink® and Real-Time Workshop®. All of the aforementioned tools are commercial software products available from The Math Works, Inc. In addition, the data acquisition application 22 and system 18 may be implemented with the Data Acquisition Toolbox® and the xPC Target®, also available from The Math Works, Inc. The Simulink® software package includes a number of different tools, such as special user interfaces and navigational tools, e.g., a library browser, which will be referenced in the description to follow. Further details of these tools and interfaces can be had with reference to available product documentation. It will be understood, however, that other graphical block diagram based modeling software platforms could be used.

The module 24 enables users to copy graphical blocks into their models from the library 36 (or, optionally, from external libraries). Thus, a user operating the computer system 20 uses the blocks, for example, the adaptive lookup table block 38, to build a graphical block diagram using the model editor 34. A user selects blocks using a menu provided by the Simulink® library browser. Having opened a model window for a model to be generated and/or edited, the user copies the selected blocks from the library window to the model window, e.g., by selecting ("clicking on") a corresponding library node or icon, dragging the block from the library browser and dropping it in the model window.

The term "graphical block diagram" refers to a set of graphical blocks (or nodes) and a set of lines (or signals) that carry data between the graphical blocks. Each graphical block typically performs a function and that function (or equation) is a sub-component of an overall set of equations describing a dynamic system. The function may be mathematical in nature or it may be an operation such as reading data from a hardware device. The graphical blocks may be parameterized with user-defined values, as will be described.

Using the functions or equations defined by each of the blocks, the graphical block diagrams can be executed to produce simulation results and generate textual software or firmware source code automatically as defined by the graphical blocks and signals in a model. Each of the equations is defined in a corresponding method (code module). For example, an output method, when invoked by the simulator 46 during model execution, determines an output signal based on a given input signal and block parameter value(s).

The adaptive lookup table block 38 implements an array of table elements and maps the table elements to one or more sets of indexed values or "breakpoints", typically non-repeating, monotonically increasing values. The breakpoints are the values at which the relationship which the table has sampled is evaluated for a given index. The breakpoints define intervals or segments in which the input value(s) may fall. The blocks determine the location of the input value relative to one of the intervals and use that location to locate the elements and their corresponding numeric table data values. The input values that fall outside these intervals are handled as well. They may be ignored or processed by the adaptive lookup table 38, e.g., treated as if falling within an end interval.

The breakpoints of a lookup table serve to partition the table input space into regions referred to as "cells". Each cell, which can be multi-dimensional, is delimited by two breakpoints for each indexing variable.

In one form of table lookup, the values of the table are associated with respective cells in the table. Thus, for example, a two dimensional table might have a cell that corresponds to the intervals (4, 5) for a first variable $x_1$, and (7,8) for a second variable $x_2$. In such a table, input values within those ranges (e.g., $x_1$=4.2 and $x_2$=7.5) would result in the value of that cell being generated as the output of the lookup table. This type of table lookup is referred to as cell-based lookup.

In another form of table lookup, the values stored in the lookup table are associated with specific intersections of input variables. For example, in a two-dimensional table, a specific value might be associated with the input values of $x_1$=4 and $x_2$=7, and a different value might be associated with the point at which $x_1$=4 and $x_2$=8, at which $x_1$=5 and $x_2$=7, and at which $x_1$=5 and $x_2$=8. In such a table, output values for input values that fall between such defined points (i.e. $x_1$=4.2 and $x_2$=7.5) may be generated by interpolation of the values associated with the specific points that surround the given point. This type of table lookup is referred to as a point-based lookup.

In one embodiment, the table lookup is a cell-based table lookup and the adaptation uses a cell-based table lookup. In the cell-based adaptation, the plant output data that is generated for given plant input data used to update a cell value for the particular cell determined by the table lookup for that input data directly, and that adapted cell value is provided at the block's output. In a second embodiment, the table lookup is point-based and the adaptation uses a point-based table lookup. In the case of the point-based adaptation, the plant output data is used to update the values of the grid points around that cell, and these adapted points (values) are then used to interpolate the exact point at the position identified by the plant input data. The interpolated point is provided at the block's output. Both of these embodiments will be described in further detail below.

The adaptive lookup table block 38 presents one abstraction of a lookup table generation and adaptation process to a high-level user interface. The adaptive lookup table block 38 can be inserted into a physical system model in a graphical simulation environment and provides the necessary connectivity with other simulation blocks in the overall model. Once the user places the graphical simulation block into the larger simulation model, the inputs and outputs of this component can be connected with other components in the model.

Figure 2:
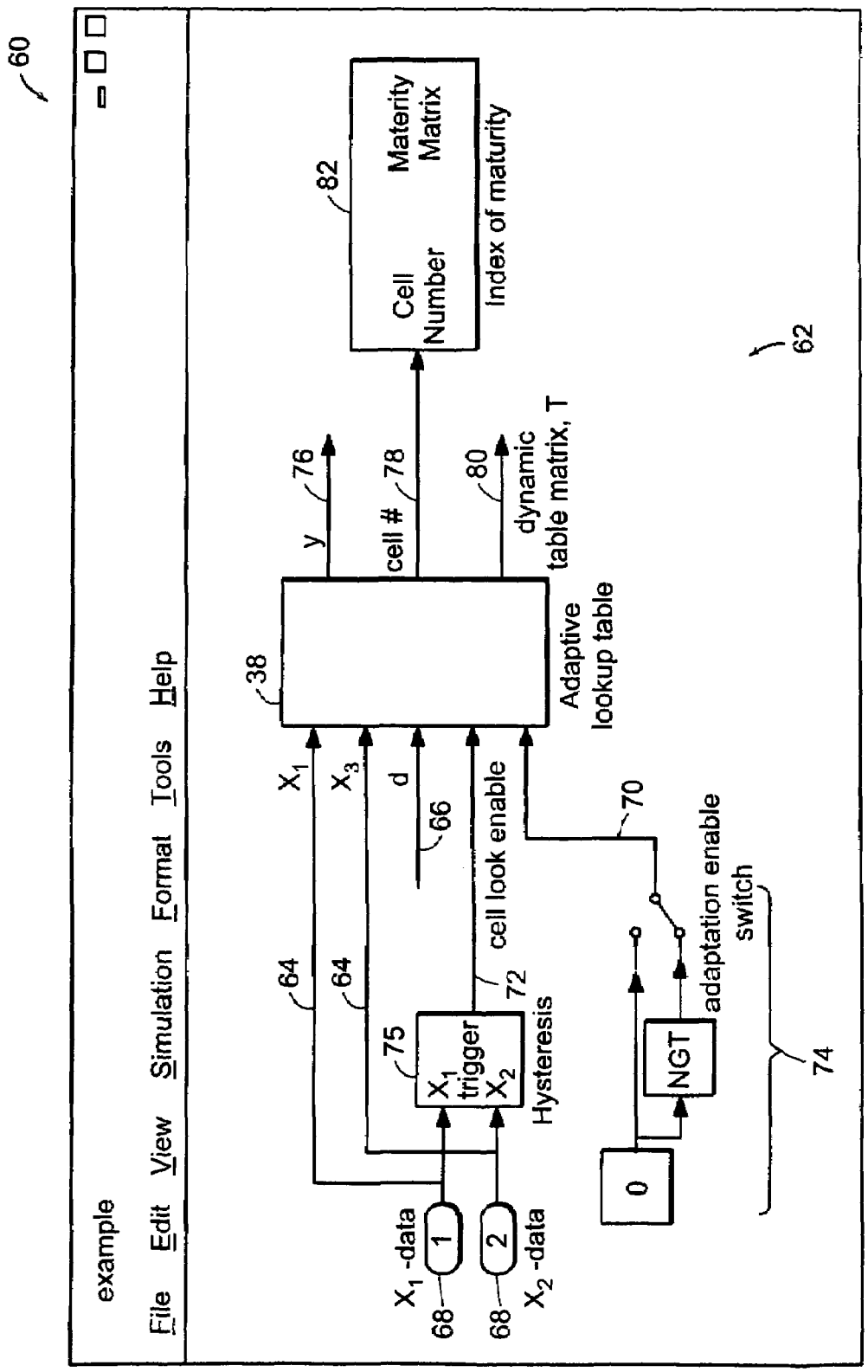
FIG. 2 is an exemplary screen display from a GUI of a computer system executing the model editor of the graphical block diagram modeling/simulation module (of FIG. 1) during development of a graphical block diagram model that includes an adaptive lookup table block.

FIG. 2 illustrates a Simulink® model window 60 that displays an exemplary block diagram model 62 created by a user using the model editor 34 and employing the adaptive lookup table block 38. The adaptive lookup table block 38 is usable to create multi-dimensional lookup tables from empirically gathered physical plant or system data.

In the illustrated embodiment, the block 38 receives the plant data, including plant input data "x" 64 and plant output data "d" 66 as inputs. The plant input data are coupled to respective input data ports 68, which receive the plant input data from the external data collection hardware via the data acquisition application 22. The plant output data "d" 66 is received from other ports not shown in this diagram, and ultimately from the output of the plant. The plant input data 64 are coordinate data and the plant output data 66 are system output measurements, and therefore correspond to the input data 14 and output data 16 (from FIG. 1), respectively. For example, if the plant 12 represents an engine and a user wishes to create a lookup table to model behavior of the engine's efficiency as a function of engine RPM and manifold pressure, then the plant input data values $x_1$ and $x_2$ would correspond to values of RPM and manifold pressure, respectively, and the value of plant output data "d" would correspond to the measured value for efficiency. In the example model 62, the block 38 is configured to perform a two-dimensional lookup table, but can be configured to accommodate any number of inputs "x" 64. More generally, it will be appreciated that an application of the adaptive lookup block 38 need not be limited to the implementation shown in FIG. 2

In addition, the block inputs can include various control signals, such as an adaptation enable/disable input 70 and a locking enable/disable input 72. The adaptation enable/disable input 70 is used to enable or disable the adaptation process. Thus, the user has the ability to start, stop or reset the lookup table adaptation through the use of the adaptation enable/disable input 70. If the lookup table adaptation functionality is disabled, then the table lookup becomes a static table lookup. It may be desirable to disable the adaptation in this manner if, for example, the user notices that there is little change in the values of the output data over time. The state of the input 70 is determined by the setting of switch logic 74 to which the input 70 is connected. The locking enable/disable input 72 is used to restrict the adaptation process to particular elements of the lookup table. More specifically, the lock input 72, in conjunction with other logic, e.g., logic 75, allow the user to update only a particular cell when the plant input data would otherwise place the updating activity outside of that cell during a table lookup/adaptation operation.

Figure 7B:
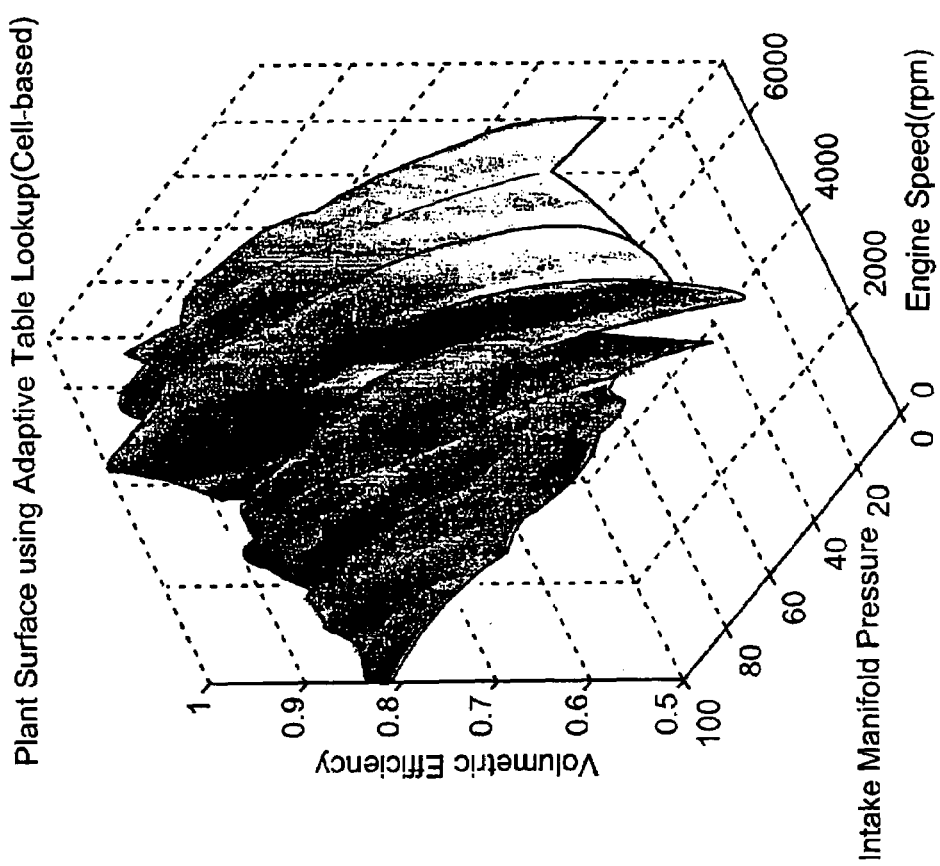
FIGS. 7A and 7B are exemplary plant surface plots generated using measured data and using data produced by adaptive (cell-based) table lookup, respectively.

The outputs of the adaptive lookup table block include a currently adapted table output value "y" 76, an index number of the currently adapted lookup table cell (i.e., cell number 78), or indices of points around the cell, and, if required, post-adaptation table data "T" 80. The table data output 80 may be useful for viewing the table contents in the model window or generating surface plots, as shown in FIG. 7B.

The cell number 78 can be used for different purposes. For example, and as shown in the figure, it can be used to maintain an index of maturity block 82. The index of maturity block 82 counts how many plant output data points the table has received within a particular cell. Thus, the index of maturity block 82 tells the user something about the precision of the table values: the more points within a table cell, the more precise is the adapted value for that cell. The cell number can also be used to track which points in the table are being adapted. If a specific test is designed to generate data in a special order, then the cell number could be compared with the expected order to ensure that that special order is followed.

Referring back to FIG. 1, the library 36 is a repository of classes that correspond to the blocks. When a graphical class is used in a model, it is said to be instantiated, i.e., an instance of the graphical class is created for use in the model. Such an instance is a link to the graphical class that resides in the library 36. The behavior of a block in a block library may be defined in terms of parameters that the user may specify when creating an instance of the block. The behavior of the block is akin to the behavior of a template class as used in object oriented programming languages such as C++. Block parameters are class members that are specified when a user constructs a new instance of a class. Instances associated with the class have parameter specification interfaces that allow a user to set values for these block parameters. On the user's GUI, such as the GUI 42 (of FIG. 1), such parameter specification interfaces take the form of a dialog box with various parameter fields (as will be described with reference to FIG. 3, below). Thus, the user supplies the block parameters to the block method for the appropriate block through a dialog box associated with the block. Alternatively, the user can specify parameter values programmatically using a textual API (e.g., the Simulink® 'set_param' command). Thus, each block in the block diagram model 62 can have parameters that are specified by a user for use in the block methods for those blocks.

FIG. 3 shows a parameters dialog box 90 for the adaptive lookup table 38. The dialog parameters that can be specified for the adaptive lookup table 38 can include the following: number of table dimensions 92; initialization data, including one set of breakpoints for each indexing variable 94, initial lookup table data 96; and a user-defined element indexing scheme (e.g., cell numbering matrix) 98. It is also possible to specify a table name 100; adaptation method 102; and adaptation speed 104. Also, and as is shown in the exemplary GUI dialog box 90, it is possible to specify the inputs and outputs to be used during simulation. For example, the dialog box 90 allows the user to select any of the following: use of one input port as initial table data port 106; use of a table data (matrix) output port 108; use of the adaptation enable/disable port 110; and use of the cell lock enable-disable port 112. Thus, it can be appreciated that most of the adaptive lookup table input and output ports, such as the enable and lock signals, and the table data output, for example, are user-configurable and can be turned on or off via the dialog box 90.

In the embodiment depicted in FIGS. 1 and 2, the plant output data may come from sensor measurements collected by running various tests on the plant 12, and the measured data (along with the corresponding plant input data) is provided to the adaptive table block 38 to generate/maintain the lookup table describing the relation between the system inputs 14 and output 16. When the model 62 is executed during simulation, the initial table begins to adapt to new plant data inputs. Copied to the table output y 76 is the value of the particular array element currently being updated 76 (cell-based) or value interpolated from the array elements being updated (point-based), the index number 80 representing the position of the adapted element(s) in the lookup table according to a user-defined numbering scheme (e.g., cell number), and, possibly, the adapted lookup table data 80 in its entirety.

Once the table is set up and initialized (via the user-specified block parameter values), the execution of the model during simulation causes adaptation algorithms defined for the block to begin learning the unknown values of the lookup table elements. These algorithms use the input and output measurements of the plant behavior to dynamically create and update the contents of the lookup table. Eventually, after a sufficient number of input values has been received so as to populate a sufficient number of cells or points in the table with stable values, a user may choose to disable the adaptation process and utilize the table as a static table for modeling the physical plant. Thus, in the embodiment described thus far, the simulation process serves to capture a model of the plant in the form of a lookup table.

Alternatively, although not shown, the block 38 could be used in a model of a plant having an adaptive lookup table as part of its functionality. That is, rather than receiving data from a physical plant or system, the adaptive lookup table could receive data from other functional blocks in a block diagram model. In this latter scenario, the simulator 46, in executing the block diagram model, would simulate the behavior of the overall system, including the adaptive lookup table (as graphically represented by the block 38). In such an application, the block's inputs would be fed by other functional component blocks in the model, that is, the inputs would receive simulated plant data, and thus the computer system 20 would not require use of internal or external plant data acquisition software or hardware (as was depicted in FIG. 1).

In general, the adaptive lookup table 38 operates as follows. When the adaptation mechanism is disabled, the lookup table acts as a standard static lookup table, providing table output values y 76 in response to received plant input values x 68. When the adaptation mechanism is enabled, the lookup table takes the following steps. It receives the plant input values x 68 and plant output value d 66. It then determines what, if any, stored values already in the table would be relevant for determining the table output value y 76 corresponding to the plant input values x 68. In other words, in the cell-based embodiment, it determines the value of the cell corresponding to plant input values x 68, whereas in the point-based embodiment, it determines the values of points immediately surrounding the point defined by input values x 68. It then uses the plant output data d 66 to modify the existing relevant value(s) in the table. Finally, it generates an output based on the newly updated tables value(s), which is provided on table output y 76.

Various techniques may be utilized to modify existing table values using plant output data d 66. A simple method would be to simply replace the existing values with the newly received plant output data d 66. However such a technique would, under some conditions, create inaccuracies due to noise on the input. Therefore, as input values 68 and output values 66 are received by adaptive lookup table 38, it is desirable that the table respond in a robust and noise tolerant way, while rapidly adapting to changing output values. Thus, the adaptation algorithms utilize various statistical and signal processing methods for robust, noise tolerant, and fast adaptation of the lookup table data. Since the simulation block 38 and the GUI dialog 90 provide a high-level interface to user inputs and encapsulate the statistical computations, the complex decision and adaptation mechanisms may be transparent to the user. The details of these mechanisms will now be described in some detail.

Figure 4:
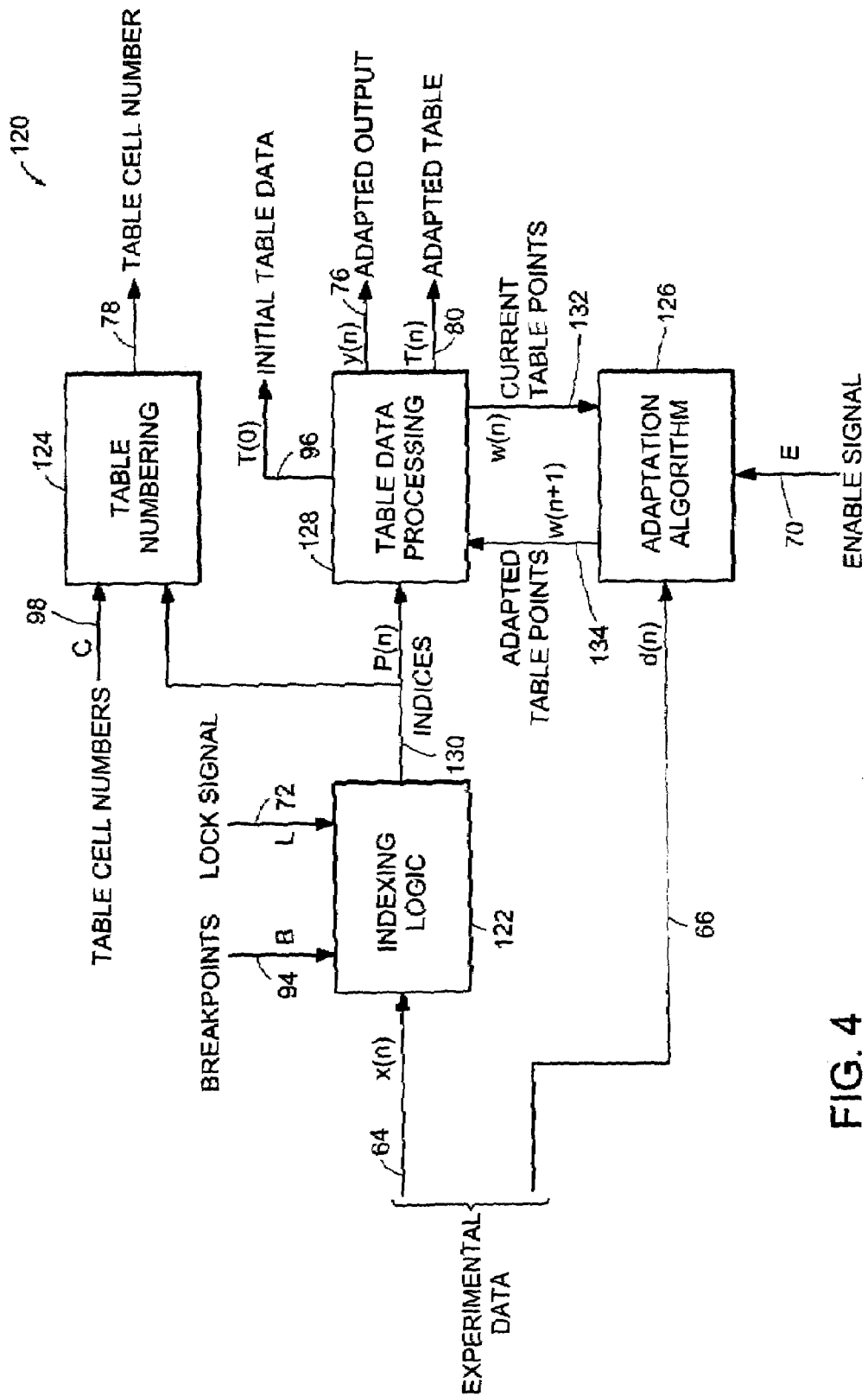
FIG. 4 is a block diagram of an adaptive table lookup corresponding to the adaptive lookup table block shown in FIG. 2.

Referring to FIG. 4, a lookup table generation and adaptation process 120 defined for the graphical block 38 is shown. In the figure, small letters denote numbers (e.g., d(n)), bold small letters denote vectors (e.g., x(n)), capital letters denote sets (e.g., P(n)), and capital bold letters denote multi-dimensional tensors (or arrays) (e.g., T(n)). In the embodiment shown, the process 120 includes four functional components: indexing logic 122, table numbering 124, adaptation algorithm 126 and table data processing 128. The indexing logic 122 receives as inputs the breakpoints 94, the lock signal 72 (optionally) and the input data 64, represented here as an input vector at time n, "x(n)". For a number of plant inputs "l", the input vector is x(n)=$[x_1(n), \ldots, x_l(n)]^T$. For x(n), the corresponding plant output 66 (either measured or simulated, as discussed above), also represented as a vector at time n, is "d(n)". The plant output d(n) 66 is provided to the adaptation algorithm 126.

The indexing logic 122 uses x(n) 64, breakpoints 94 and lock signal 72 (if used) to generate indices P(n) 130. The indices 130 are provided to the table numbering 124 and the table data processing 128. The table numbering 124, which also receives the table cell numbers 98 (from the user block parameter dialog input), uses the cell numbers 98 and the indices 130 to select from the cell numbers 98 the cell number corresponding to the indices 130. The table data processing 128 receives the initial table data 96 (from the user block parameter dialog input), and uses the indices 130 to determine an element or elements at the corresponding table cell location. That element is the element to be updated to take into account the new data, that is, d(n). Thus, the table processing 128 provides the currently stored element or elements 132 to the adaptation algorithm 126, which adapts each element value according to a particular algorithm, as will be described below, and returns the adapted value of that element or elements to the table data processing 128. The table data processing 128 stores the adapted value. The table data processing 128 provides an adapted plant output value as the table output 76, represented as output y(n) at time n. In the cell-based embodiment, y(n) is the same as the stored adapted value, that is, the adapted cell value. In the point-based embodiment, once the element (grid point) values are adapted, an interpolation is performed using the adapted points to determine the adapted output value y(n). If the table data output 80 is configured by the user, then the table data processing 128 also provides as an output the table data 80, or T(n), which incorporates the results of the current adaptation iteration.

For each plant input, $x_i$, there is a corresponding vector of breakpoints $b_i$ with $k_i$ elements, which grids the input space in the $i^{th}$ dimension. The set of all breakpoints which grid the l-dimensional input space is given by $$B=\{b_i \in R^{ki} | k_i \in N, i=1,\ldots,\},\quad (1)$$

where each $b_i=[b_i(1),\ldots,b_i(k_i)]^T$.

Given the input vector x(n), the set of indices, P(n), is determined so that each index within the set locates the input value $x_i(n)$ within the corresponding vector of breakpoints, $b_i$. That is, $$P(n)=\{p_i(n) \in N | b_i(p_i) \leq x_i(n) \leq b_i(p_i+1),\ i=1,\ldots,l\}. \quad (2)$$

The vector of indices p(n) is obtained by ordering the set P(n):

$$p(n)=[p_1(n),\ldots,p_l(n)]^T. \quad (3)$$

The corresponding set of fractions and the vector of fractions are given by $$F(n)=\{f_i(n) \in R | x_i(n)=(1-f_i(n))b_i(p_i)+f_i(n)b_i(p_i+1), i=1,\ldots,l\}, \quad (4)$$

and $$f(n)=[f_1(n),\ldots,f_l(n)]^T. \quad (5)$$

The set of indices P(n) corresponding to an input x(n) at time n is used to select m elements of the current table data T(n):

$$W(n)=\{w_j(n) \in R | w_j(n)=w_j(n;P(n)), j=1,\ldots,m\}, \quad (6)$$

where the number m depends on the type of adaptation scheme that is used. The set W(n) contains those elements of the table T(n) that will be adapted in the current iteration.

The ordered set of elements of W(n) is represented by the vector w(n):

$$w(n)=[w_1(n),\ldots,w_m(n)]^T. \quad (7)$$

The adaptation scheme uses the vector w(n) and the plant output d(n) to generate the table output, y(n), an estimation error e(n) and the new table element values w(n+1):

$$y(n)=w^H(n)u(n) \quad (8)$$

$$e(n)=d(n)-y(n) \quad (9)$$

$$w(n+1)=w(n)+h(w(n), e(n), u(n)), \quad (10)$$

where the form of the vector u(n), and the vector function h(·) depend on the adaptation method used.

Figure 5:
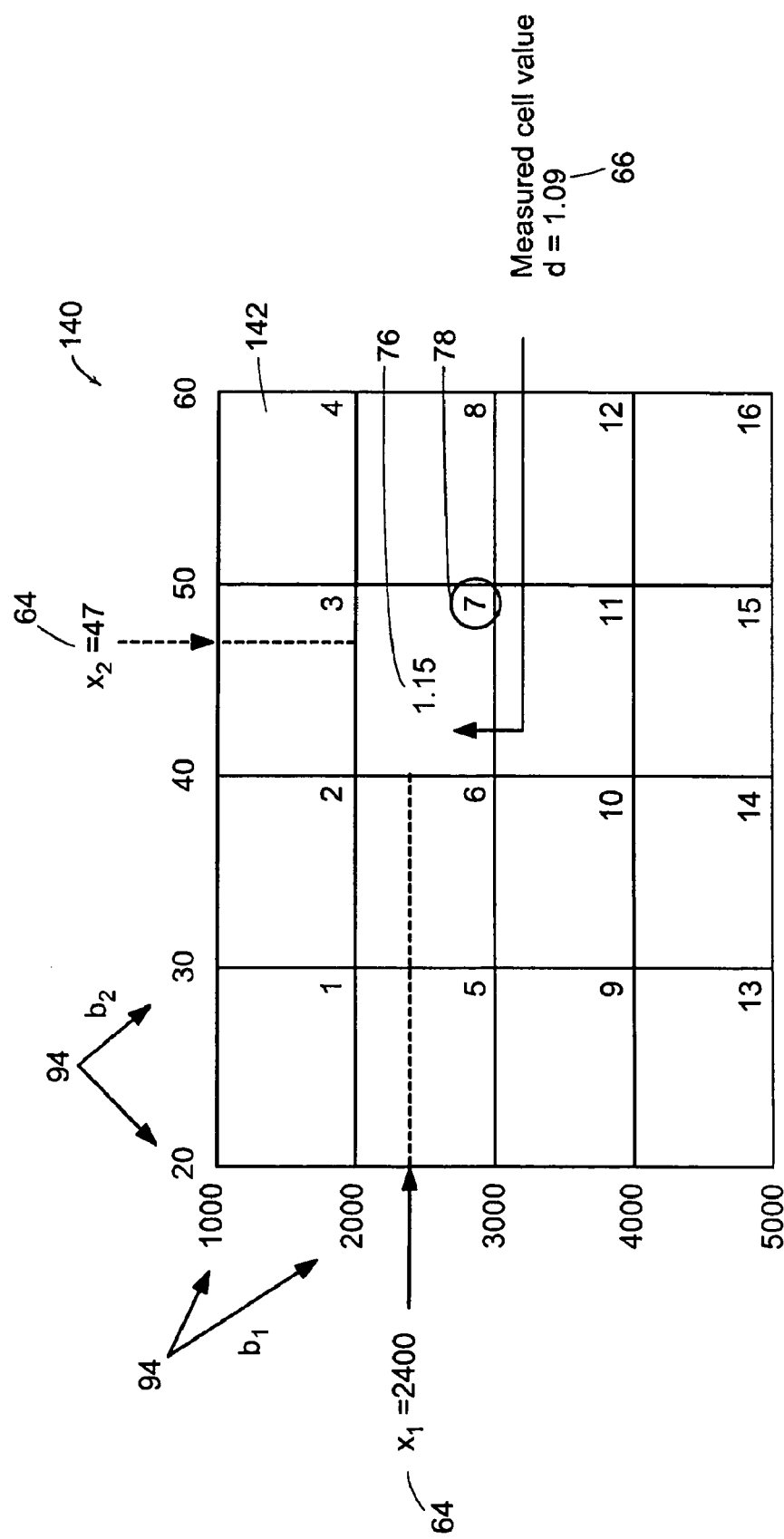
FIG. 5 is a depiction of an exemplary, two-dimensional cell-based ($0^{th}$ order) adaptive table lookup.

In the cell-based embodiment, each element of the lookup table T(n) stores a numeric value corresponding to a particular cell. FIG. 5 shows an example of a two-dimensional table 140 of cells 142 (as defined by the breakpoints 94). In the cell-based adaptation scheme, each cell 142 has an adaptation weight, which depends on the specific adaptation algorithm used. If the current operating point $(x_1, x_2)$ lies within a cell, that cell is adapted using the corresponding plant output data "d" 66. The particular cell is located by comparing the input data with the breakpoints 94 of the corresponding indexing variables. In the example shown, a pair of input data $(x_1=2400, x_2=47)$ is used to locate the corresponding cell to be updated. The adapted cell value "y" 76 and the cell number 78, that is, the values of 1.15 and 7, respectively, are the outputs of the lookup table. The cell value can be used for control, whereas the cell number can be used as an indicator of the current operating point for the user or other logic. Various adaptation algorithms used to update the cell value are discussed below.

One type of adaptation algorithm that can be employed in a cell-based embodiment is Recursive Sample Mean (RSM). For the cell-based embodiment, the sample mean is defined as $$y(n) = \frac{1}{n}\sum_{i=1}^{n} d(i), \quad (11)$$

and provides the average value of n output data samples, where each d(i) is the $i^{th}$ measurement collected within a particular cell. For each input data pair $(x_1, x_2)$, the sample mean at the corresponding operating point (cell) is updated using the output data measurement, d.

In practice, instead of accumulating n samples of data for each cell, a recursive relation is used to calculate the sample mean. A recursive expression can be obtained from the definition (11) as follows:

$$y(n) = 1 \Big/ n\left[\sum_{i=1}^{n-1} d(i) + d(n)\right] \quad (12)$$

$$= (n-1)\Big/n\left[1/n-1\sum_{i=1}^{n-1} d(i)\right] + (1/n)*d(n)$$

$$= (n-1)/n[y(n-1)] + (1/n)*d(n)$$

where d(n) is the $n^{th}$ data sample.

Using an estimation error defined as e(n)=d(n)-y(n-1), the recursive relation (12) can be written as $$y(n)=y(n-1)+(1/n)*e(n), \quad (13)$$

where $n \geq 1$ and the initial estimate $y(0)$ is arbitrary. In this expression, only the number of samples, n, for each cell has to be stored in memory, instead of storing n data samples required in Equation (11). A further simplification is possible by reformulating the recursion (13) as $$w(n)=w(n-1)+1 \qquad (14)$$

$$y(n)=y(n-1)+e(n)/w(n),$$

where w(n) is the recursive adaptation weight with initial value w(0)=0.

The recursive mean algorithm defined in Equation (13) has an infinite memory so that the past data samples have the same weight as the final sample in the calculation of the sample mean. In contrast, an RSM algorithm with a forgetting factor puts more weight on the more recent samples and has robustness against initial response transients of the plant behavior. In addition, the forgetting factor provides an adjustable speed of adaptation. The recursive sample mean with forgetting factor is defined as $$y(n) = 1 \Big/ \left[\sum_{i=1}^{n} \lambda^{n-i}\right] \left[\sum_{i=1}^{n} \lambda^{n-i} d(i)\right] \qquad (15)$$

$$= 1 \Big/ \left[\sum_{i=1}^{n} \lambda^{n-i}\right] \left[\sum_{i=1}^{n-1} \lambda^{n-i} d(i) + d(n)\right]$$

$$= [s(n-1)/s(n)] * y(n-1) + 1/s(n) * d(n)$$

where $\lambda \in [0,1]$ is the forgetting factor and $$s(k) = \sum_{i=1}^{k} \lambda^{n-i}.$$

Using the estimation error defined as $e(n)=d(n)-y(n-1)$, the recursive relation (15) can be written as $$y(n) = y(n-1) + [1/s(n)] * e(n)$$

$$= y(n-1) + [(1-\lambda)/(1-\lambda^n)] * e(n),$$

(16)

where $n \geq 1$ and the initial estimate $y(0)$ is arbitrary. It should be noted that a small value for $\lambda$ results in faster adaptation. A further simplification is possible by reformulating the recursion (16) as $$w(n)=\lambda w(n-1)+1,$$

$$y(n)=y(n-1)+e(n)/w(n) \qquad (17)$$

where w(n) is the recursive adaptation weight with initial value w(0)=0.

The Recursive Sample Mean and the Recursive Sample Mean with Forgetting Factor adaptation techniques discussed above are equivalent to the well-known Recursive Least Squares (RLS) algorithm in one dimension, where the variable $k(n)=1/w(n)$ is the gain vector.

Figure 6:
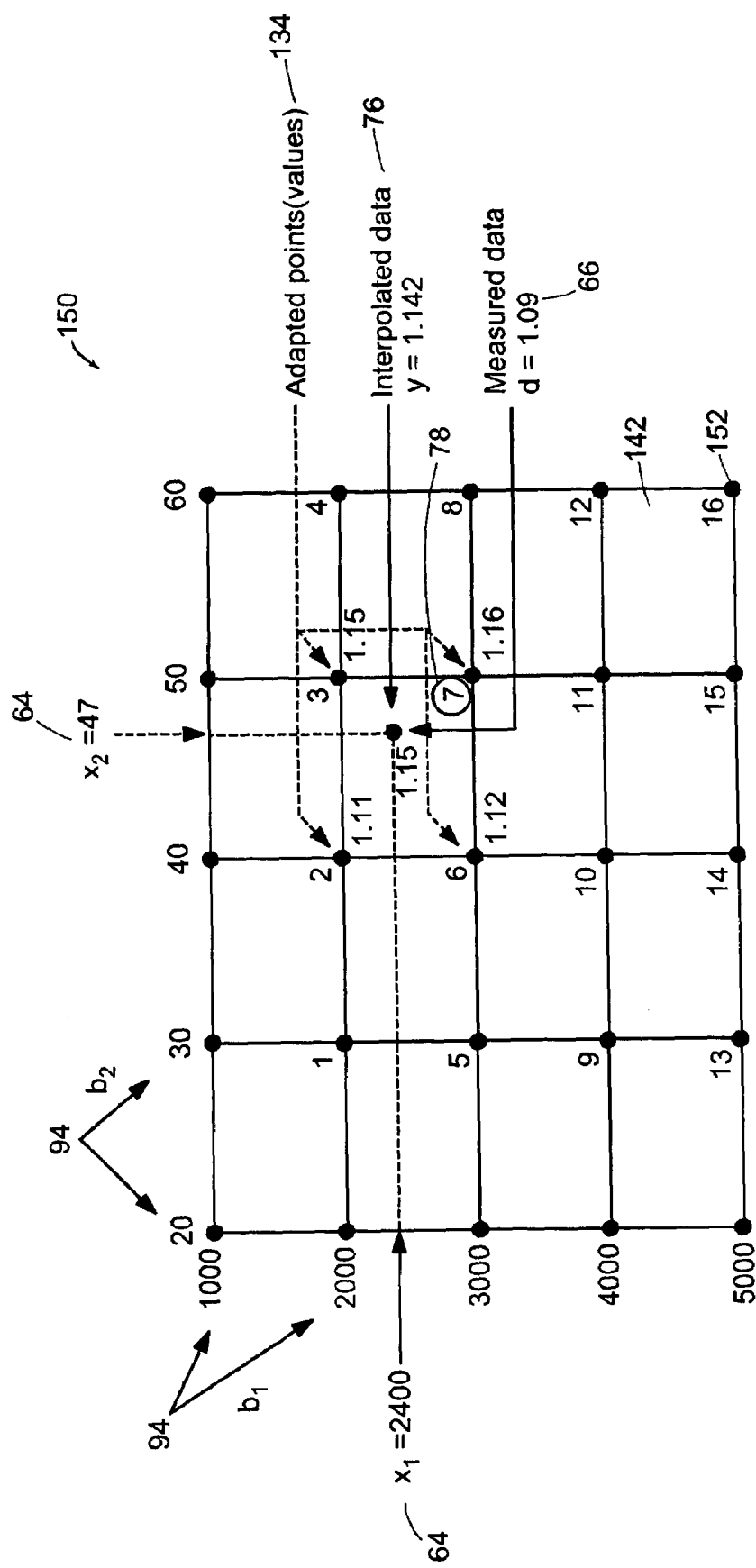
FIG. 6 is a depiction of an exemplary, two-dimensional point-based (1$^{st}$ order) adaptive table lookup.

In a point-based embodiment, each element of the lookup table stores a numeric value corresponding to a particular point which is a location in the multi-dimensional space defined by the breakpoints of the indexing variables. FIG. 6 shows an example of a two-dimensional point-based lookup 150, where each dot represents a point 152. In the point-based embodiment, each point has an adaptation weight, which depends on the specific adaptation algorithm used. If the current operating point $(x_1, x_2)$ lies within a cell, the points that define the boundaries of that cell are adapted (adapted point values 134) according to where the operating point is located relative to the measured data, shown in the example as d=1.09. The particular cell is located by comparing the input data 64 with the breakpoints 94 of the corresponding indexing variables. In the example shown, a pair of input data $(x_1=2400, x_2=47)$ 64 and the adapted points around this operating point 134 are shown in the figure. The value of the "adapted" operating point 76 (y=1.142), which is found by interpolation of the adapted (neighboring) table points, and the cell number 78 are the outputs. The interpolated point table output value 76 is used for control, whereas the cell number 78 is used as an indicator of the current operating point for the user or other logic.

The adaptation algorithms used to update the point-based lookup table values include, but are not limited to, the well-known Least-Mean Squares (LMS) or Recursive Least Squares (RLS) techniques. The LMS technique uses the adaptation equations (8, 9, 10) with $$u(n)=u_m(n), m=2, \qquad (18)$$

where $$u_i(n) = u_{i-1}(n) \otimes \begin{bmatrix} 1 - f_i(n) \\ f_i(n) \end{bmatrix}. \qquad (19)$$

In equation (19), the symbol ⊗ denotes the Kronecker product with $i \geq 1$ and $u_0(n)=1$.

The granularity of the breakpoints sets can be used to control the precision of the output y(n). Greater spacing between breakpoints results in a higher degree of datapoint compression, that is, in fewer cells. A reduced spacing between the breakpoints means more cells for a finer (more precise) representation of the plant output (surface).

It is also possible to incorporate into the block functionality logic that samples the plant output data values as they are made available for use by the adaptive lookup block 38, thus selecting which of the values are used (or are not used) in the adaptation.

Figure 7A:
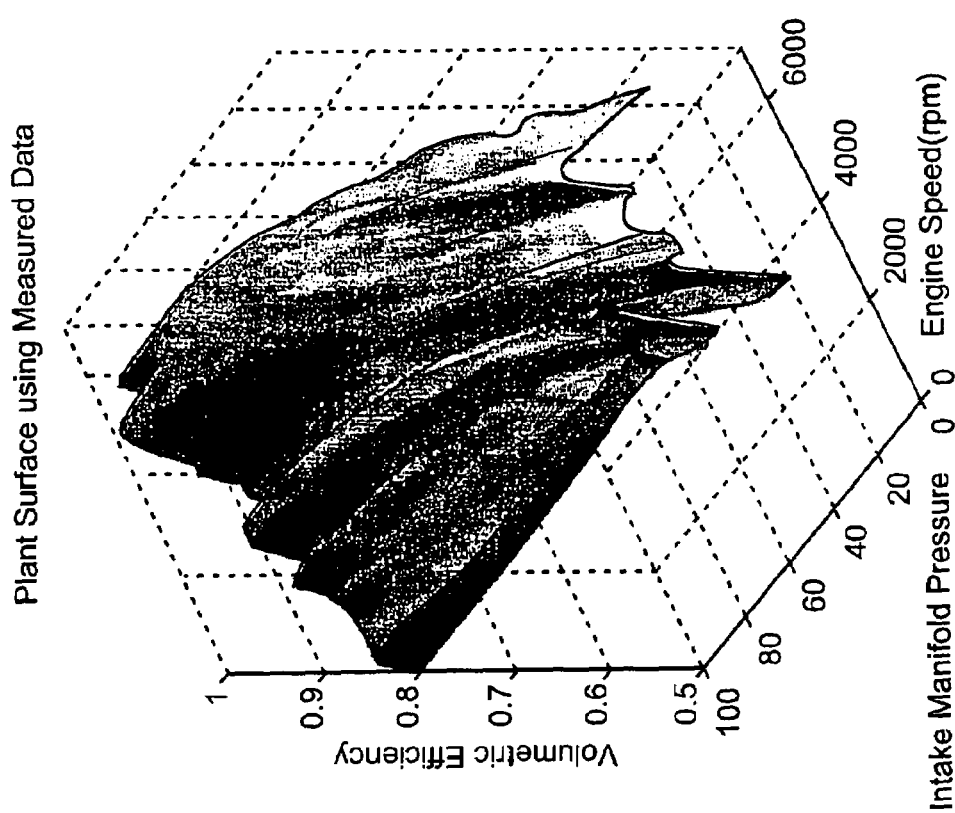

FIGS. 7A and 7B are plant surface plots of volumetric efficiency as a function of intake manifold pressure and engine speed. The plot shown in FIG. 7A was generated directly from measured values of volumetric efficiency, whereas the plot of FIG. 7B was generated from the output of the block 38 in a cell-based embodiment, that is, using adapted values of volumetric efficiency to provide a close approximation of the plant surface, as seen in the figures.

The lookup table generation and adaptation block is useful in a number of different types of applications. As already described above and depicted in FIG. 1, the block can be used to model the steady-state behavior of an unknown system (plant) by measuring outputs from sensors on the plant and capturing the data into the adaptive table. This behavior information can then be used to construct a time-varying plant model that will later be used during control design. The adaptive lookup table can also be used in a real-time environment, where some time-varying properties of a system need to be captured. For such an application, the model 62 can be created and initialized using the block dialog 90, as discussed above. Instead of executing the model during a simulation run, using measured or simulated plant data, however, the module 24 generates executable C code from the method(s) and block parameter values defined for the block 38 using the code generator 48, e.g., Real-Time Workshops® available from The Mathworks, Inc. The code could then be loaded into the microcomputer or controller of the target application. Applications that could use the generated adaptive lookup table program include: real-time adaptation and control applications, e.g., of hydraulic servo or proportional valves in the presence of valve wear and pressure/flow variations, as well as control applications which use real-time (or off-line) generation of tables, e.g., in the automotive context, generation of fuel tables to comply with emission standards and ensure that a stoichiometric Air-to-Fuel Ratio is held in the presence of engine changes due to aging and environmental conditions, or, in the Aerospace context, generation and adaptation of flight-tables in airplane control applications.

In some real-time adaptation and control environments in which output data is collected via sensors, the output data signals may be particularly noisy. In a noisy environment, the table can be operated in adaptation mode to smooth the values in the table. That is, although real output data measurements are available, it may be desirable to use the processed lookup table values in place of those measurements. Moreover, system reliability may be enhanced through the inclusion of the lookup table in an environment in which sensor data is normally used. For example, if a sensor fails, the table lookup adaptation can be disabled and the content of the table can be made available in a static table lookup mode. Consequently, output data values are always available.

For a control application in which sensor data is not collected in real-time, lookup table content can be captured in a laboratory first and then loaded into a table for use in a static table lookup mode. At some later point in time, after the table has been operating as a static lookup table, because system conditions may have changed over time, it may be desirable to calibrate the table contents. Thus, the table can be connected to sensors and switched to adaptation mode for some period of time to calibrate the contents. Once the content has been calibrated, the table adaptation is again disabled and the table operates in static table lookup mode with the new values generated during the calibration/adaptation process.

It is to be understood that while the invention has been described in conjunction with the detailed description thereof, the foregoing description is intended to illustrate and not limit the scope of the invention, which is defined by the scope of the appended claims. Other embodiments are within the scope of the following claims.

What is claimed is:

1. A computer-implemented table lookup method, comprising:
   providing to a graphical block diagram model a graphical block that defines a lookup table, wherein the graphical block includes block input ports for connection to at least one other graphical block in the graphical block diagram model so that input data can be received by the graphical block at the block inputs ports from the at least one other a graphical block; and
   using the graphical block to update content stored in the lookup table based on received input data.

2. The method of claim 1, wherein the graphical block includes a block output, the block output including a block output port for connection to at least one other graphical block in a graphical block diagram model, and wherein using comprises reproducing results of the content updating at the output port.

3. The method of claim 2, wherein the block output further includes a copy of the lookup table content at all table locations after the updating is completed.

4. The method of claim 2, wherein the block output includes a table index number corresponding to the location of the updated content.

5. The method of claim 1, further comprising:
   maintaining the graphical block in a block library; and
   instantiating the graphical block to create the lookup table.

6. The method of claim 5, further comprising receiving parameters from a user to instantiate the graphical block.

7. The method of claim 6, wherein receiving comprises providing the user with a dialog box for specifying values of the parameters of the graphical block.

8. The method of claim 7, wherein the parameters comprise breakpoint data and initial table data.

9. The method of claim 1, further comprising receiving block parameters from a user to initialize the block, the parameters including breakpoint data and initial table data.

10. The method of claim 9, wherein the graphical block defines an adaptation process and wherein using comprises enabling the adaptation process to update the content of the lookup table according to a statistical estimation algorithm.

11. The method of claim 10, wherein the adaptation process comprises a Recursive Sample Mean algorithm.

12. The method of claim 10, wherein the adaptation process comprises a Recursive Sample Mean algorithm and uses a forgetting factor to place more weight on most recently received plant output values.

13. The method of claim 1, wherein using comprises executing the graphical block diagram model for simulation purposes.

14. A method of claim 1, wherein using comprises:
   initializing the lookup table with initial table data and breakpoint data;
   using the graphical block diagram of the graphical block diagram model as a specification for interpretation by automatic code generation software that generates code to perform computations equivalent to the computations performed by the graphical block diagram model; and
   executing the generated code in a controller of a real-time control application.

15. The method of claim 1, wherein the lookup table is included in a simulation model that simulates an embedded control system.

16. The method of claim 1, wherein breakpoint data specified by a user partitions the table into cells and the content that is updated is a cell value, further comprising:
   adjusting the spacing of the breakpoint data to control the number of cells in the table.

17. The method of claim 1, wherein the input data includes an adaptation control signal to enable or disable the lookup table content updating.

18. The method of claim 1, wherein the block input ports are configured to connect to a locking mechanism that restricts the content updating to a particular cell in the lookup table.

19. A computer implemented table lookup method, said method comprising:
providing to a graphical block diagram model a graphical block that defines a lookup table and having inputs for receiving input data; and
using the graphical block to update content stored in the lookup table based on received input data,
wherein the lookup table is used to capture the behavior of a plant, and the received input data comprises the input data and output data of the plant.

20. The method of claim 19, wherein the plant input data comprises a value for at least one plant input.

21. The method of claim 19, wherein the plant output data is measured data.

22. The method of claim 21, wherein the plant input data and output data are received from the plant in real-time.

23. The method of claim 21, wherein the plant input data and output data are read from a storage device.

24. The method of claim 19, wherein the block diagram model is a model of a plant that includes a lookup table, and the plant output data is simulated data produced when the model is executed.

25. The method of claim 19, wherein the plant input data is usable by the graphical block to determine a location in the lookup table.

26. The method of claim 25, wherein the location corresponds to a table cell.

27. The method of claim 26, wherein the table content to be updated is a value associated with the table cell.

28. The method of claim 26, wherein the location corresponds to a table cell and a particular operating point within the table cell, the location of the operating point within the cell being determined by interpolation of neighboring cell points.

29. The method of claim 28, wherein the table content to be updated comprises values of neighboring points used in the interpolation and wherein the adaptation process weights the updated values based according to results of the interpolation.

30. The method of claim 29, wherein the adaptation process comprises a Least Mean Squares algorithm.

31. The method of claim 29, wherein using comprises determining an adapted operating point by interpolation using the values of the neighboring points after such points have been updated by the adaptation process.

32. A computer program product residing on a computer-readable medium that provides a table lookup, the computer program product comprising instructions causing a computer to:
provide to a graphical block diagram model a graphical block that defines a lookup table, wherein the graphical block includes block input ports for connection to at least one other graphical block in the graphical block diagram model so that input data can be received by the graphical block at the input ports from the at least one other graphical block; and
use the graphical block to update content stored in the lookup table based on received input data.

33. A computer-implemented method, comprising:
operating a lookup table in a static lookup mode in which the table receives one or more input values, determines at least one previously stored value corresponding to the input values, and produces output data using the at least one previously stored value; and
operating the lookup table in a dynamic adaptation mode in which the table receives the at least one input value and at least one additional value, and in which the table uses the at least one additional value to modify previously stored at least one value corresponding to the at least one input value,
wherein the lookup table is defined by a block that is part of a block diagram model.

34. The method of claim 33, wherein, in the dynamic adaptation mode, the table produces output data using the modified previously stored at least one value.

35. The method of claim 33, wherein the lookup table is operated in the dynamic adaptation mode in an interpreted block diagram environment, and further comprising, after operating the lookup table in the dynamic adaptation mode, generating compiled code using the modified previously stored at least one value, and using the compiled code to operate the lookup table in the static lookup mode.

36. The method of claim 33, wherein the at least one additional value is received from a sensor, and further comprising, during the dynamic adaptation mode, determining whether the sensor has failed and switching to the static mode if the sensor has failed.

37. The method for claim 33, comprising:
operating the lookup table in the static mode;
during operation in the static mode, switching to dynamic mode to update the previously stored at least one value; and
switching back to static mode after the previously stored at least one value has been updated.

38. In a device, a system for providing a lookup table, the system comprising:
a graphical block associated with a graphical block diagram model, the graphical block defining a lookup table, wherein the graphical block includes block input ports for connection to at least one other graphical block in the graphical block diagram model that input data can be received by the graphical block at the input ports from the at least one other graphical block; and
wherein the graphical block includes an updating mechanism to update content stored in the lookup table of the graphical block based on received input data.

39. The system of claim 38, wherein the graphical block includes a block output, the block output including a block output port for connection to at least one other graphical block in a graphical block diagram model, and wherein the graphical block is used to reproduce results of the content updating at the output port.

40. The system of claim 39, wherein the graphical block output further includes a copy of the lookup table content at all table locations after the updating is completed.

41. The system of claim 38, wherein the graphical block is maintained in a block library, and the graphical block is instantiated to create the lookup table.

42. The system of claim 41, wherein the graphical block defines an adaptation process and is used to enable the adaptation process to update the content of the table according to a statistical estimation algorithm.

43. The system of claim 42, wherein the adaptation process comprises a Recursive Sample Mean algorithm and uses a forgetting factor to place more weight on most recently received plant output values.

44. The system of claim 43, wherein the location corresponds to a table cell and a particular operating point within the table cell, the location of the operating point within the cell being determined by interpolation of neighboring cell points.

45. The system of claim 44, wherein the table content to be updated comprises values of neighboring points used in the interpolation and wherein the adaptation process weights the updated values based according to results of the interpolation.

46. The system of claim 45, wherein the adaptation process comprises a Least Mean Squares algorithm.

47. The system of claim 42, wherein the adaptation process comprises a Recursive Sample Mean algorithm.

48. The system of claim 45, wherein the graphical block determines an adapted operating point by interpolation using the values of the neighboring points after such points have been updated by the adaptation process.

49. The system of claim 38, wherein block parameters are received from a user to initialize the block, the parameters including breakpoint data and initial table data.

50. The system of claim 49, further comprising a dialog box for specifying values of the parameters of the graphical block.

51. The system of claim 38, wherein the graphical block diagram model is executed for simulation purposes.

52. The system of claim 38,
wherein the system further comprises automatic code generation software and a controller of real-time controller application;
wherein the lookup table is initialized with initial table data and breakpoint data;
wherein the graphical block diagram of the graphical block diagram model is used as a specification for interpretation by the automatic code generation software that generates code to perform computations equivalent to the computations performed by the graphical block diagram model; and
wherein the generated code is executed in the controller of the real-time control application.

53. The system of claim 38, wherein the lookup table is included in a simulation model that simulates an embedded control system.

54. The system of claim 38,
wherein breakpoint data specified by a user partitions the table into cells and the content that is updated is a cell value; and
wherein the spacing of the breakpoint is adjusted to control the number of cells in the table.

55. The system of claim 38, wherein the input data includes an adaptation control signal to enable or disable the lookup table content updating.

56. The system of claim 38, wherein the block input ports are configured to connect to a locking mechanism that restricts the content updating to a particular cell in the lookup table.

57. In a device, a system for providing a lookup table, the system comprising:
a graphical block associated with a graphical block diagram model, the graphical block defining a lookup table and having inputs for receiving input data;
wherein the graphical block includes an updating mechanism to update content stored in the lookup table of the graphical block based on received input data,
wherein the lookup table is used to capture the behavior of a plant, and the received input data comprises the input data and output data of the plant.

58. The system of claim 57, wherein the plant output data comprises measured data.

59. The system of claim 58, wherein the plant input data and output data are received from the plant in real-time.

60. The system of claim 58, wherein the plant input data and output data are read from a storage device.

61. The system of claim 58, wherein the block diagram model is a model of a plant that includes a lookup table, and the plant output data is simulated data produced when the model is executed.

62. The system of claim 57, wherein the plant input data is used by the graphical block to determine a location in the lookup table.

63. The system of claim 62, wherein the location corresponds to a table cell, and to table content is updated is a value associated with the table cell.

64. The system of claim 57, wherein the graphical block output includes a table index number corresponding to the location of the updated content.

65. A computer-implemented table lookup method, comprising:
providing to a graphical block diagram model a graphical block that defines a lookup table and having inputs for receiving input data; and
using the graphical block to update content stored in the lookup table based on received input data,
wherein the graphical block includes a block output, the block output including a block output port for connection to at least one other graphical block in a graphical block diagram model, and wherein using comprises reproducing results of the content updating at the output port.

66. A computer-implemented table lookup method, comprising:
providing to a graphical block diagram model a graphical block that defines a lookup table and having inputs for receiving input data; and
using the graphical block to update content stored in the lookup table based on received input data,
wherein using the graphical block comprises executing the graphical block diagram model for simulation purposes.

67. A computer-implemented table lookup method, comprising:
providing to a graphical block diagram model a graphical block that defines a lookup table and having inputs for receiving input data, wherein breakpoint data specified by a user partitions the table into a number of cells;
using the graphical block to update a cell value stored in the lookup table based on received input data; and
adjusting the spacing of the breakpoint data to control the number of cells in the table.

68. A computer program product residing on a computer-readable medium that provides a table lookup, the computer program product comprising instructions causing a computer to:
provide to a graphical block diagram model a graphical block that defines a lookup table and having inputs for receiving input data; and
use the graphical block to update content stored in the lookup table based on received input data,
wherein the graphical block includes a block output, the block output including a block output port for connection to at least one other graphical block in a graphical block diagram model, and wherein using comprises reproducing results of the content updating at the output port.

69. A computer program product residing on a computer-readable medium that provides a table lookup, the computer program product comprising instructions causing a computer to:

provide to a graphical block diagram model a graphical block that defines a lookup table and having inputs for receiving input data; and use the graphical block to update content stored in the lookup table based on received input data, wherein using the graphical block comprises executing the graphical block diagram model for simulation purposes.

70. A computer program product residing on a computer-readable medium that provides a table lookup, the computer program product comprising instructions causing a computer to:

provide to a graphical block diagram model a graphical block that defines a lookup table and having inputs for receiving input data, wherein breakpoint data specified by a user partitions the table into a number of cells;

use the graphical block to update a cell value stored in the lookup table based on received input data; and adjust the spacing of the breakpoint data to control the number of cells in the table.

71. A computer program product residing on a computer-readable medium that provides a table lookup, the computer program product comprising instructions causing a computer to:

provide to a graphical block diagram model a graphical block that defines a lookup table and having inputs for receiving input data; and use the graphical block to update content stored in the lookup table based on received input data, wherein the lookup table is used to capture the behavior of a plant, and the received input data comprises the input data and output data of the plant.

72. A computer-implemented method, comprising:

operating a lookup table in a static lookup mode in which the table receives one or more input values, determines at least one previously stored value corresponding to the input values, and produces output data using the at least one previously stored value; and operating the lookup table in a dynamic adaptation mode in which the table receives the at least one input value and at least one additional value, and in which the table uses the at least one additional value to modify previously stored at least one value corresponding to the at least one input value, the table produces output data using the modified previously stored at least one value.

73. In a device, a system for providing a lookup table, the system comprising:

a graphical block associated with a graphical block diagram model, the graphical block defining a lookup table and having inputs for receiving input data; and wherein the graphical block includes an updating mechanism to update content stored in the lookup table of the graphical block based on received input data, wherein the graphical block includes a block output, the block output including a block output port for connection to at least one other graphical block in a graphical block diagram model, and wherein the graphical block is used to reproduce results of the content updating at the output port.

74. In a device, a system for providing a lookup table, the system comprising:

a graphical block associated with a graphical block diagram model, the graphical block defining a lookup table and having inputs for receiving input data; and wherein the graphical block includes an updating mechanism to update content stored in the lookup table of the graphical block based on received input data, wherein the graphical block diagram model is executed for simulation purposes.

75. In a device, a system for providing a lookup table, the system comprising:

a graphical block associated with a graphical block diagram model, the graphical block defining a lookup table and having inputs for receiving input data, wherein breakpoint data specified by a user partitions the table into a number of cells; and wherein the graphical block includes an updating mechanism to update a cell value stored in the lookup table of the graphical block based on received input data, wherein the spacing of the breakpoint data is adjusted to control the number of cells in the table.

* * * * *

UNITED STATES PATENT AND TRADEMARK OFFICE
CERTIFICATE OF CORRECTION

| | |
|---|---|
| PATENT NO. | : 7,139,687 B2 |
| APPLICATION NO. | : 10/036675 |
| DATED | : November 21, 2006 |
| INVENTOR(S) | : Bora Eryilmaz et al. |

It is certified that error appears in the above-identified patent and that said Letters Patent is hereby corrected as shown below:

On the title page, item (73) Assignee, replace "The Mathworks, Inc." with --The MathWorks, Inc.--.

Signed and Sealed this
Ninth Day of December, 2014

Michelle K. Lee
*Deputy Director of the United States Patent and Trademark Office*